(12) United States Patent
Maeyama et al.

(10) Patent No.: US 10,031,241 B2
(45) Date of Patent: Jul. 24, 2018

(54) RADIATION DOSIMETRY GEL AND RADIATION DOSIMETER COMPRISING THE SAME AS MATERIAL FOR MEASURING RADIATION DOSE

(71) Applicants: RIKEN, Wako-shi, Saitama (JP); NISSAN CHEMICAL INDUSTRIES, LTD., Tokyo (JP)

(72) Inventors: Takuya Maeyama, Wako (JP); Nobuhisa Fukunishi, Wako (JP); Kenichi Ishikawa, Wako (JP); Yasuhiro Ishida, Wako (JP); Takuzo Aida, Wako (JP); Kazuaki Fukasaku, Wako (JP); Yoshihiro Kudo, Funabashi (JP); Souichi Monma, Funabashi (JP)

(73) Assignees: RIKEN, Wako-shi (JP); NISSAN CHEMICAL INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/537,456

(22) PCT Filed: Dec. 18, 2015

(86) PCT No.: PCT/JP2015/085521
§ 371 (c)(1),
(2) Date: Aug. 14, 2017

(87) PCT Pub. No.: WO2016/098888
PCT Pub. Date: Jun. 23, 2016

(65) Prior Publication Data
US 2017/0350989 A1 Dec. 7, 2017

(30) Foreign Application Priority Data
Dec. 19, 2014 (JP) ................. 2014-257836

(51) Int. Cl.
*G03G 5/10* (2006.01)
*G01T 1/167* (2006.01)
(Continued)

(52) U.S. Cl.
CPC ............. *G01T 1/167* (2013.01); *C08K 3/08* (2013.01); *C08K 3/34* (2013.01); *C08L 33/06* (2013.01);
(Continued)

(58) Field of Classification Search
CPC ......... C08L 2312/06; G01T 1/02; G01T 1/04; G01T 1/167; C08K 2003/0856; C08K 3/08; C08K 3/34; C08K 3/346; C08F 255/02
(Continued)

(56) References Cited

U.S. PATENT DOCUMENTS 7,098,463 B2* 8/2006 Adamovics ............... G01T 1/06
250/474.1
2004/0211917 A1* 10/2004 Adamovics ............... G01T 1/06
250/474.1
(Continued)

FOREIGN PATENT DOCUMENTS

JP 2002-214354 A 7/2002
JP 2011-503602 A 1/2011
(Continued)

OTHER PUBLICATIONS

Mar. 15, 2016 Written Opinion of International Searching Authority issued in International Patent Application No. PCT/JP2015/085521.
(Continued)

*Primary Examiner* — Taeho Jo
(74) *Attorney, Agent, or Firm* — Oliff PLC

(57) ABSTRACT

A radiation dosimetry gel is excellent in heat resistance, and a radiation dosimeter includes the radiation dosimetry gel as
(Continued)

a material for measuring a radiation dose. A radiation dosimetry gel includes a water-soluble organic polymer (A) having an organic acid salt structure or an organic acid anion structure, a silicate (B), and a dispersant (C) for the silicate, and a radiation dosimeter includes the radiation dosimetry gel as a material for measuring a radiation dose.

12 Claims, 4 Drawing Sheets

(51) Int. Cl.
    *C08L 33/06* (2006.01)
    *G01T 1/04* (2006.01)
    *C08K 3/34* (2006.01)
    *C08K 3/08* (2006.01)

(52) U.S. Cl.
    CPC ........ *G01T 1/04* (2013.01); *C08K 2003/0856* (2013.01)

(58) Field of Classification Search
    USPC .................................................. 250/472.1
    See application file for complete search history.

(56) References Cited

U.S. PATENT DOCUMENTS

| | | | | |
|---|---|---|---|---|
| 2005/0208290 | A1* | 9/2005 | Patel | C09K 11/06 428/323 |
| 2011/0017924 | A1* | 1/2011 | Stanley | G01T 1/08 250/474.1 |
| 2011/0312097 | A1* | 12/2011 | Hiroki | G01T 1/04 436/57 |
| 2012/0065291 | A1* | 3/2012 | Matsumura | G03F 7/0045 522/183 |
| 2014/0102540 | A1* | 4/2014 | Kobayashi | C09B 23/0091 136/263 |
| 2014/0295564 | A1* | 10/2014 | Maeyama | G01T 1/04 436/58 |
| 2015/0050214 | A1* | 2/2015 | Basfar | C08K 5/49 424/9.1 |

FOREIGN PATENT DOCUMENTS

| | | |
|---|---|---|
| JP | 2011-133598 A | 7/2011 |
| JP | 5590526 B2 | 9/2014 |
| JP | 2014-185969 A | 10/2014 |
| JP | 2014-209093 A | 11/2014 |
| JP | 2015-017934 A | 1/2015 |
| JP | 2015-098523 A | 5/2015 |

OTHER PUBLICATIONS

Shin'ichiro Hayashi, "Verification of 3D Dose Distribution Using Polymer Gel Dosimeter," JPN. J. Med. Phys., Sep. 30, 2013, vol. 32, No. 3, pp. 125-129.

Mar. 15, 2016 Search Report issued in International Patent Application No. PCT/JP2015/085521.

* cited by examiner

RADIATION DOSIMETRY GEL AND RADIATION DOSIMETER COMPRISING THE SAME AS MATERIAL FOR MEASURING RADIATION DOSE

TECHNICAL FIELD

The present invention relates to a radiation dosimetry gel and a radiation dosimeter comprising the radiation dosimetry gel as a material for measuring a radiation dose. More specifically, the present invention relates to a radiation dosimetry gel used for measuring a three-dimensional dose distribution, and to a radiation dosimeter comprising the radiation dosimetry gel as a material for measuring a radiation dose.

BACKGROUND ART

Forms of radiation therapy for cancer that provide highly precise treatments are being introduced. Such forms of radiation therapy include stereotactic radiation therapy (SRT) in which pinpoint radiation therapy is performed, and intensity modulated particle therapy (IMPT) in which the radiation field can be set three-dimensionally along the contour of cancer, while changing the dose intensity within the same radiation field. In these therapeutic methods, the integral value (i.e., dose distribution) of amounts of microscopic energy deposited in three-dimensional positions of the target is precisely adjusted. Furthermore, particle therapy, which uses charged particle beams with high dose concentration, such as proton beams or heavy ion beams (e.g., carbon and neon beams), has been practiced. Particle therapy has the advantage of treating tumors by controlling the irradiated position and radiation dose with higher precision than conventional X-ray therapy. Particle therapy is required to emit energy properly from a particle beam into the target position such as a lesion in an in vivo tissue, and simultaneously minimize the effect on normal tissue surrounding the target. For these purposes, radial spread of the particle beam and the position of the Bragg peak of the particle beam are aligned with the target position in the object to be irradiated.

In actual radiation therapy treatment planning, the dose distribution in three-dimensional positions within an in vivo tissue is optimized. In typical treatment planning, the dose distribution (radiation dose in each position) within the target tissue is modified in accordance with the therapeutic purpose, and simultaneously, the effect of radiation on the surrounding normal tissue is minimized, resulting in a minimal effect on an organ at risk. To create a dose distribution with such a complicated shape, beams may be precisely controlled, and may be emitted from multiple directions. To control in this way, a filter, a collimator, and the like (a range shifter, a multileaf collimator, a bolus, and the like) adjusted to the object to be irradiated are equipped. To achieve such highly controlled radiation therapy, a high degree of quality assurance and quality control (hereinafter abbreviated to "QA/QC") is required for the entire apparatus including a radiation device, auxiliary instruments, a filter, a collimator, and the like, as well as the irradiation process using these devices.

The QA/QC for the treatment planning and the various devices requires a technology that enables actual measurement of a correct integral of amounts of energy deposited by multiple beams of ionizing radiation incident from various direction at various acceleration energies. The reason for this is that, if the dose in each position can be precisely measured by integrating the amounts of deposited energy, a three-dimensional distribution of deposited energy (dose distribution), which supports the QA/QC, can be measured. For this purpose, one- or two-dimensional dosimeters such as ionization chamber dosimeters, semiconductor detectors, or film-type dosimeters have been conventionally used. These dosimeters perform actual measurement of the above-described dose distribution along one- or two-dimensional coordinates, in a region where the particle beam is to be aligned to the target position. In addition to these dosimeters, gel dosimeters have recently attracted attention which can measure a three-dimensional dose distribution by means of a gel using the measurement principle of a chemical dosimeter. The use of a gel dosimeter provides an additional advantage in that amounts of energy deposited by radiation beams in the positions of water, which is a substance that can be regarded as equivalent to a living body, can be accurately measured, i.e., the effect of radiation on a living body-equivalent substance or a water-equivalent substance can be measured. A gel dosimeter can be used to obtain a three-dimensional dose distribution, while using the gel dosimeter per se as a solid phantom.

Fricke gel dosimeters (Patent Document 1) or polymer gel dosimeters (Patent Documents 2 to 4), for example, have been reported as gel dosimeters that can measure a three-dimensional dose distribution. A Fricke gel dosimeter is a gel containing a solution (aqueous solution containing ferrous sulfate) for a Fricke dosimeter known as a liquid chemical dosimeter. The Fricke gel dosimeter uses the phenomenon in which the oxidation reaction (coloration) of iron from the divalent to trivalent state due to radiation increases proportionately with the absorbed dose. On the other hand, a polymer gel dosimeter contains monomers dispersed in a gel. Upon irradiation, a polymer is produced proportionately with the dose, and thus, the dose can be estimated by determining the amount of the polymer produced (opacity). The produced polymer is characterized by being unlikely to diffuse in the gel, showing stable opacity over time, and being visually excellent in that the opaque portion appears floating in the transparent gel.

PRIOR ART DOCUMENTS

Patent Documents

Patent Document 1: Japanese Patent Application Publication No. 2014-209093 (JP 2014-209093 A)
Patent Document 2: Japanese Patent No. 5590526 (JP 5590526 B2)
Patent Document 3: Japanese Patent Application Publication No. 2002-214354 (JP 2002-214354 A)
Patent Document 4: Japanese Patent Application Publication No. 2014-185969 (JP 2014-185969 A)

SUMMARY OF THE INVENTION

Problem to be Solved by the Invention

Conventional gel dosimeters employ gelators including natural polymers such as gelatin and gellan gum (Patent Documents 2 and 3), as well as polysaccharide derivatives such as hydroxypropylcellulose and methyl cellulose and synthetic polymers such as polyvinyl alcohols (Patent Document 4), for gelation. In particular, gelatin is widely used.

The preparation of a gel dosimeter using gelatin requires heating gelatin with stirring, followed by cooling. The coagulated gelatin, however, dissolves at 25 to 30° C., which causes the opaque portion in the gel to break or vary, for example. Furthermore, since it is difficult to enhance reproducibility in the preparation of a gel dosimeter that involves temperature variations, the preparation of such a gel dosimeter with high precision requires an advanced technology.

In view of the aforementioned problems of gel dosimeters prepared with gelatin, Patent Document 1 has proposed a gel dosimeter prepared with clay particles. This gel dosimeter suppresses the diffusion of a recording material by using the solidification effect attributed to the thixotropy of the clay particles.

Means for Solving the Problem

The present inventors conducted extensive research regarding a gel having heat resistance that can be produced simply by mixing at room temperature without requiring heating. As a result, they found that a gel comprising a water-soluble organic polymer (A) having an organic acid salt structure or an organic acid anion structure, a silicate (B), and a dispersant (C) for the silicate serves as a radiation dosimetry gel having excellent heat resistance, thus completing the present invention.

A first aspect of the present invention relates to a radiation dosimetry gel characterized by comprising a water-soluble organic polymer (A) having an organic acid salt structure or an organic acid anion structure, a silicate (B), and a dispersant (C) for the silicate.

A second aspect of the present invention relates to the radiation dosimetry gel according to the first aspect, wherein the water-soluble organic polymer (A) is a fully neutralized or partially neutralized polyacrylate having a weight average molecular weight of 1,000,000 to 10,000,000.

A third aspect of the present invention relates to the radiation dosimetry gel according to the first or second aspect, wherein the silicate (B) is one or more water-swellable silicate particles selected from the group consisting of smectites, bentonite, vermiculite, and mica.

A fourth aspect of the present invention relates to the radiation dosimetry gel according to any one of the first to third aspects, wherein the dispersant (C) is one or more selected from the group consisting of sodium orthophosphate, sodium pyrophosphate, sodium tripolyphosphate, sodium tetraphosphate, sodium hexametaphosphate, sodium polyphosphate, sodium poly(meth)acrylate, ammonium poly(meth)acrylate, sodium acrylate/sodium maleate copolymer, ammonium acrylate/ammonium maleate copolymer, sodium hydroxide, hydroxylamine, sodium carbonate, sodium silicate, polyethylene glycol, polypropylene glycol, sodium humate, and sodium ligninsulfonate.

A fifth aspect of the present invention relates to the radiation dosimetry gel according to any one of the first to fourth aspects, further comprising a compound (D) having a divalent or higher positive charge.

A sixth aspect of the present invention relates to the radiation dosimetry gel according to the fifth aspect, wherein the compound (D) is one or more compounds selected from the group consisting of compounds containing group II elements, compounds containing transition elements, compounds containing amphoteric elements, and compounds containing polyamines.

A seventh aspect of the present invention relates to the radiation dosimetry gel according to any one of the first to sixth aspects, comprising a radiation polymerizable monomer.

An eighth aspect of the present invention relates to the radiation dosimetry gel according to any one of the first to sixth aspects, comprising iron(II) ions or iron(III) ions, or both.

A ninth aspect of the present invention relates to the radiation dosimetry gel according to any one of the first to sixth aspects, comprising a radiosensitive pigment.

A tenth aspect of the present invention relates to the radiation dosimetry gel according to any one of the first to ninth aspects, comprising a deoxidizer.

An eleventh aspect of the present invention relates to the radiation dosimetry gel according to any one of the first to tenth aspects, comprising a pH adjuster.

A twelfth aspect of the present invention relates to a radiation dosimeter comprising the radiation dosimetry gel according to any one of the first to eleventh aspects as a material for measuring a radiation dose.

Effects of the Invention

The radiation dosimetry gel of the present invention has heat resistance superior to that of gelatin and the like widely used in conventional gel dosimeters.

Moreover, the radiation dosimetry gel of the present invention can be produced simply by mixing raw materials that are industrially readily available, at room temperature without requiring heating, and hence, can be readily produced as a gel of uniform quality, and can be used in the form of an injectable gel, as a material for measuring a radiation dose in a radiation dosimeter.

Furthermore, the radiation dosimetry gel of the present invention has sufficient strength. For example, the radiation dosimetry gel of the present invention typically has a hardness ("elastic modulus") or strength ("breaking stress") sufficient to maintain the gel shape without a support such as a container, i.e., has a self-supporting property. The radiation dosimetry gel of the present invention, therefore, can be used to prepare not only gel dosimeters prepared using glass or plastic containers, but also flexible gel dosimeters prepared using plastic wrap having low oxygen permeability.

MODES FOR CARRYING OUT THE INVENTION

<Radiation Dosimetry Gel>

Figure 1:
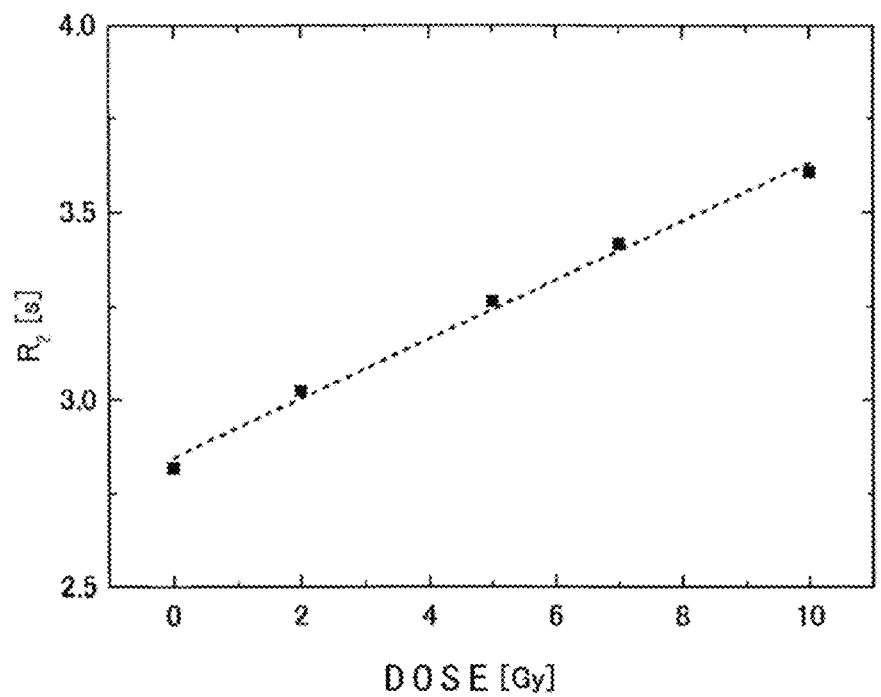
FIG. 1 is a graph showing the results of an irradiation test for a radiation dosimeter in Example 2.

Components of the radiation dosimetry gel of the present invention include a water-soluble organic polymer (A) having an organic acid salt structure or an organic acid anion structure, a silicate (B), a dispersant (C) for the silicate, and, as required, a compound (D) having a divalent or higher positive charge. Besides the above-listed components, however, the radiation dosimetry gel of the present invention may contain any other components, as required, without impairing the desired effects of the present invention.

[Component (A): Water-Soluble Organic Polymer Having an Organic Acid Salt Structure or an Organic Acid Anion Structure]

Examples of the water-soluble organic polymer (A) having an organic acid salt structure or an organic acid anion structure include water-soluble organic polymers having salt structures or anion structures of organic acid groups such as carboxyl group, sulfonyl group, and phosphonyl group.

Examples of such water-soluble organic polymers include those having carboxyl groups, such as salts of poly(meth)acrylic acid, salts of carboxyvinyl polymers, and salts of carboxymethyl cellulose; those having sulfonyl groups, such as salts of polystyrene sulfonic acid; and those having phosphonyl groups, such as salts of polyvinylphosphonic acid. In particular, salts of polyacrylic acid are preferred. As used herein, the term "(meth)acrylic acid" refers to both acrylic acid and methacrylic acid.

Examples of water-soluble organic polymers having salt structures of organic acid groups include sodium salts, ammonium salts, potassium salts, and lithium salts of the above-described organic acid groups.

On the other hand, examples of water-soluble organic polymers having anion structures of organic acid groups include those having structures resulting from the dissociation of cations from organic acid groups or salts of organic acids.

The above-described water-soluble organic polymer (A) preferably has a linear structure without a branched or chemically crosslinked structure, and may be either a fully neutralized product or a partially neutralized product of a polymer having an organic acid group. In the present invention, the water-soluble organic polymer (A) may be a fully neutralized product or a partially neutralized product of a polymer having an organic acid group, or a mixture thereof.

The above-described water-soluble organic polymer (A) has a weight average molecular weight that is preferably 1,000,000 or more and 10,000,000 or less, and more preferably 2,500,000 or more and 5,000,000 or less, as calculated in terms of polyethylene glycol using gel permeation chromatography (GPC).

The water-soluble organic polymer (A) in the present invention is preferably a fully neutralized or partially neutralized polyacrylate, more preferably a fully neutralized or partially neutralized linear polyacrylate, and particularly preferably a fully neutralized or partially neutralized linear sodium polyacrylate having a weight average molecular weight of 2,500,000 or more and 5,000,000 or less.

The content of the above-described water-soluble organic polymer (A) is 0.001 to 20% by mass, and preferably 0.01 to 10% by mass, in 100% by mass of the radiation dosimetry gel.

[Component (B): Silicate]

Examples of the silicate (B) include water-swellable silicate particles such as smectites, bentonite, vermiculite, and mica. The silicate (B) is preferably a silicate that forms a colloid using water or a water-containing liquid as the dispersion medium. The term "smectites" refers collectively to clay minerals having swelling properties, such as montmorillonite, beidellite, hectorite, saponite, and stevensite.

Examples of shapes of primary particles of the silicate particles include a disk shape, a plate shape, a spherical shape, a particle shape, a cubic shape, a needle shape, a rod shape, and an amorphous shape. A preferred example is a disk or plate shape having a diameter of 5 to 1,000 nm.

Specific preferred examples of silicates include layered silicates, and examples of such silicates that are readily available as commercial products include LAPONITE XLG (synthetic hectorite), XLS (synthetic hectorite, containing sodium pyrophosphate as a dispersant), XL21 (sodium magnesium fluorosilicate), RD (synthetic hectorite), RDS (synthetic hectorite, containing an inorganic polyphosphate as a dispersant), and S482 (synthetic hectorite, containing a dispersant) from Rockwood Additives Ltd.; LUCENTITE SWN (synthetic smectite) and SWF (synthetic smectite), MICROMICA (synthetic mica), and SOMASIF (synthetic mica) from Co-op Chemical Co., Ltd.; Kunipia (montmorillonite) and Sumecton SA (synthetic saponite) from Kunimine Industries Co., Ltd.; and BENGEL (purified products of natural bentonite) from Hojun Co., Ltd.

The content of the above-described silicate (B) is 0.01 to 20% by mass, and preferably 0.1 to 10% by mass, in 100% by mass of the radiation dosimetry gel.

[Component (C): Dispersant for the Silicate]

A dispersant or a deflocculant used for the purpose of improving the dispersibility of a silicate or delaminating a layered silicate can be used as the dispersant (C) for the silicate. For example, a phosphate-based dispersant, a carboxylate-based dispersant, a substance that acts as an alkali, or an organic deflocculant can be used.

Examples of phosphate-based dispersants include sodium orthophosphate, sodium pyrophosphate, sodium tripolyphosphate, sodium tetraphosphate, sodium hexametaphosphate, and sodium polyphosphate; examples of carboxylate-based dispersants include sodium poly(meth)acrylate, ammonium poly(meth)acrylate, sodium acrylate/sodium maleate copolymer, and ammonium acrylate/ammonium maleate copolymer; examples of substances that act as alkalis include sodium hydroxide and hydroxylamine; examples of substances that react with polyvalent cations to form insoluble salts or complex salts include sodium carbonate and sodium silicate; and examples of organic deflocculants include polyethylene glycol, polypropylene glycol, sodium humate, lignin, and sodium sulfonate. A preferred phosphate-based dispersant is sodium pyrophosphate; a preferred carboxylate-based dispersant is low-polymerization-degree sodium polyacrylate having a weight average molecular weight of 1,000 or more and 20,000 or less; and a preferred organic deflocculant is polyethylene glycol (e.g., PEG 900).

Low-polymerization-degree sodium polyacrylate is known to act as a dispersant by, for example, interacting with silicate particles to produce carboxy anion-derived negative charges on the particle surface, thereby dispersing the silicate because of the charge repulsion.

The content of the above-described dispersant (C) is 0.001 to 20% by mass, and preferably 0.01 to 10% by mass, in 100% by mass of the radiation dosimetry gel.

In the present invention, when a silicate containing a dispersant is used, it is optional to further add the dispersant.

[Component (D): Compound Having a Divalent or Higher Positive Charge]

Examples of the compound (D) having a divalent or higher positive charge include one or more compounds selected from the group consisting of compounds containing group II elements, compounds containing transition elements, compounds containing amphoteric elements, and compounds containing polyamines.

Examples of compounds containing group II elements include compounds of beryllium, magnesium, and calcium; examples of compounds containing transition elements include compounds of scandium, titanium, vanadium, chromium, manganese, iron, cobalt, nickel, copper, zirconium, molybdenum, ruthenium, rhodium, and palladium; examples of compounds containing amphoteric elements include compounds of zinc, cadmium, mercury, aluminum, gallium, indium, thallium, tin, and lead; and examples of compounds containing polyamines include compounds of ethylenediamine, phenylenediamine, hydrazine, putrescine, cadaverine, spermidine, and spermine.

These compounds may each be an oxide or hydroxide or a salt having a divalent or higher positive charge. Moreover, a compound containing a polyamine may be in free form.

Examples of acids that form such salts include sulfuric acid, hydrochloric acid, hydrobromic acid, hydrofluoric acid, trifluoroacetic acid, acetic acid, phosphoric acid, diphosphoric acid, hexametaphosphoric acid, polyphosphoric acid, silicic acid, aluminic acid, trifluoromethanesulfonic acid, methanesulfonic acid, and p-toluenesulfonic acid.

The compound (D) having a divalent or higher positive charge is preferably the hydrochloride, sulfate, diphosphate, silicate, or aluminate of magnesium, calcium, or aluminum, and more preferably magnesium chloride, calcium chloride, magnesium sulfate, aluminum sulfate, calcium diphosphate, or magnesium aluminosilicate.

When the radiation dosimetry gel of the present invention contains the component (D), the content of the above-described compound (D) is 0.001 to 50% by mass, and preferably 0.01 to 20% by mass, in 100% by mass of the radiation dosimetry gel.

An example of a preferred combination of the above-described water-soluble: organic polymer (A), silicate (B), and dispersant (C) for the silicate is a combination including, as the component (A), 0.01 to 10% by mass of a fully neutralized or partially neutralized linear sodium polyacrylate having a weight average molecular weight of 2,500,000 or more and 5,000,000 or less; as the component (B), 0.1 to 10% by mass of a water-swellable smectite or saponite; and as the component (C), 0.01 to 10% by mass of sodium pyrophosphate or 0.01 to 10% by mass of low-polymerization-degree sodium polyacrylate having a weight average molecular weight of 1,000 or more and 20,000 or less; in 100% by mass of the radiation dosimetry gel.

When the radiation dosimetry gel of the present invention contains the component (D), an example of a preferred combination of the above-described water-soluble organic polymer (A), silicate (B), dispersant (C) for the silicate, and compound (D) is a combination including, as the component (A), 0.01 to 10% by mass of a fully neutralized or partially neutralized linear sodium polyacrylate having a weight average molecular weight of 2,500,000 or more and 5,000,000 or less; as the component (B), 0.1 to 10% by mass of a water-swellable smectite or saponite; as the component (C), 0.01 to 10% by mass of sodium pyrophosphate or 0.01 to 10% by mass of low-polymerization-degree sodium polyacrylate having a weight average molecular weight of 1,000 or more and 20,000 or less; and as the component (D), 0.01 to 20% by mass of magnesium chloride, calcium chloride, or magnesium sulfate; in 100% by mass of the radiation dosimetry gel.

[Radiation Polymerizable Monomer]

The radiation dosimetry gel of the present invention may contain a radiation polymerizable monomer, so that a radiation dosimeter comprising the radiation dosimetry gel of the present invention as a material for measuring a radiation dose functions as a polymer gel dosimeter.

The above-described radiation polymerizable monomer is not particularly limited as long as it has an unsaturated carbon-carbon bond that is polymerizable by the action of radiation, and examples include methyl methacrylate, ethyl methacrylate, 2-methoxymethyl methacrylate, 2-ethoxyethyl methacrylate, 2-hydroxyethyl methacrylate, triethylene glycol monoethyl ether monomethacrylate, methyl acrylate, ethyl acrylate, butyl acrylate, 2-methoxyethyl acrylate, N-vinyl-pyrrolidone, acrylamide, acryloylmorpholine, N-isopropylacrylamide, methacryloyl-L-alanine methyl ester, and acryloyl-L-proline methyl ester.

Furthermore, the radiation polymerizable monomer preferably forms a polymer having a crosslinked structure to prevent the polymer produced after irradiation from diffusing or moving in the gel. Thus, the radiation dosimetry gel of the present invention preferably contains at least one monomer having two or more unsaturated bonds per molecule (hereinafter also referred to as a "polyfunctional monomer"). Examples of such polyfunctional monomers include N,N'-methylenebisacrylamide, N,N'-diallylacrylamide, N,N'-diacryloylimide, triallylformal, diallylnaphthalene, ethylene glycol diacrylate, ethylene glycol dimethacrylate, various polyethylene glycol di(meth)acrylates, propylene glycol diacrylate, propylene glycol dimethacrylate, various polypropylene glycol di(meth)acrylates, 1,3-butylene glycol diacrylate, 1,3-butylene glycol dimethacrylate, 1,4-butylene glycol dimethacrylate, various polybutylene glycol di(meth)acrylates, glycerol dimethacrylate, neopentyl glycol dimethacrylate, trimethylolpropane triacrylate, trimethylolpropane trimethacrylate, tetramethylolmethane tetramethacrylate, and divinyl compounds such as divinylbenzene. Monomers containing 1, 2, 3, 4, 9, 14, or 23 ethylene glycol units are available, and in particular, a water-soluble monomer containing 9 or more ethylene glycol units is preferred from the viewpoint of solubility. Although some of the above-listed monomers are poorly soluble in water, these monomers may be uniformly dispersed in the gel so that the entire gel before irradiation is transparent. To further enhance the uniform dispersibility, an organic solvent such as an alcohol may be added in an amount of 5% or less.

The content of the radiation polymerizable monomer is preferably 2 to 15% by mass, and more preferably 3 to 8% by mass, in 100% by mass of the radiation dosimetry gel.

[Iron Ions]

The radiation dosimetry gel of the present invention may contain iron ions. Examples of iron ions include iron(II) ions and iron(III) ions. The radiation dosimetry gel of the present invention may contain both iron(II) ions and iron(III) ions, rather than only one of iron(II) ions and iron(III) ions.

<Iron (II) Ions>

When the radiation dosimetry gel of the present invention contains iron(II) ions, it may be a gel that uses coloration due to radiation-induced oxidation of iron(II) ions to iron(III) ions. Thus, a radiation dosimeter comprising the radiation dosimetry gel of the present invention as a material for measuring a radiation dose functions as a Fricke gel dosimeter, for example.

The radiation dosimetry gel of the present invention may contain an iron(II) ion-producing compound, so that it contains iron(II) ions. Such an iron(II) ion-producing compound is not particularly limited as long as it can produce iron(II) ions in the form of an aqueous solution, and examples include ammonium iron(II) and iron(II) sulfate.

<Iron(III) Ions>

When the radiation dosimetry gel of the present invention contains iron(III) ions, it may be a gel that uses coloration due to radiation-induced reduction of iron(III) ions to iron (II) ions. Thus, a radiation dosimeter comprising the radiation dosimetry gel of the present invention as a material for measuring a radiation dose functions as a TBG gel dosimeter (Turnbull blue dosimeter), for example.

The radiation dosimetry gel of the present invention may contain an iron(III) ion-producing compound, so that it contains iron(III) ions. Such an iron(III) ion-producing compound is not particularly limited as long as it can produce iron(III) ions in the form of an aqueous solution, and examples include potassium hexacyanoferrate(III), ammonium iron(III) citrate, and iron(III) chloride hexahydrate.

The content of the above-described iron(II) ions is preferably 0.05 to 5 mM, and more preferably 0.1 to 2 mM, in the radiation dosimetry gel.

The content of the above-described iron(III) ions is preferably 0.1 to 5 mM, and more preferably 0.45 to 2 mM, in the radiation dosimetry gel.

[Radiosensitive Pigment]

The radiation dosimetry gel of the present invention may contain a radiosensitive pigment. Such a radiosensitive pigment is not particularly limited as long as it is a compound that undergoes a change in color (discoloration or coloration) in response to radiation, and examples include triphenylmethanes or triarylmethanes such as leuco crystal violet, leuco malachite green, bis(4-diethylamino-2-methylphenyl)phenylmethane, and tris(4-diethylamino-2-methylphenyl)methane; triphenylmethane phthalides such as leuco crystal violet lactone and leuco malachite green lactone; fluoranes such as 3-diethylamino-7-chlorofluorane, 3-diethylaminobenzo-α-fluorane, 3-diethylamino-7-dibenzylaminofluoran, and 3,6-dimethoxyfluorane; phenothiazines such as 3,7-bisdimethylamino-10-(4'-aminobenzoyl)phenothiazine, p-nitrobenzyl leuco methylene blue, and benzoyl leuco methylene blue; indolyl phthalides such as 3,3-bis(1-ethyl-2-methylindol-3-yl)phthalide and 3,3-bis(1-n-butyl-2-methylindol-3-yl)phthalide; leucoauramines such as N-(2,3-dichlorophenyl)leucoauramine and N-phenyl leucoauramine; rhodamine lactones such as rhodamine B lactone; rhodamine lactams such as rhodamine B-o-chloroaminolactam, rhodamine B anilinolactam, and rhodamine B-p-chloroanilinolactam; indolines such as 2-(phenyliminoethanedilidene)-3, 3'-dimethylindoline; diphenylmethanes such as 4,4-bis(dimethylaminophenyl)benzhydrylbenzylether, N-halophenyl leucoauramine, and N-2,4,5-trichlorophenyl leucoauramine; naphthopyrans such as 3-methylspirodinaphthopyran, 3-ethylspirodinaphthopyran, 3,3-dichlorospirodinaphthopyran, and 3-benzylspirodinaphthopyran; spiro compounds such as 3-propylspirobenzopyran, 3,6-bis(dimethylamino)fluorene-9-spiro-3'-(6'-dimethylaminophthalide), and 3-diethylamino-6-dimethylaminofluorene-9-spiro-3'-(6'-dimethylaminophthalide); azaphthalides such as 3-indolyl-3-aminophenylazaphthalide; chromenoindole; phenazines such as aminodihydrophenazine; triazenes; naphtholactams; diacetylenes; and azomethines.

Among the above, triphenylmethanes or triarylmethanes are preferred, and in particular, leuco crystal violet is the most preferred.

The content of the radiosensitive pigment is preferably 0.5 to 5 mM, and more preferably 1 to 2 mM, in the radiation dosimetry gel.

The radiation dosimetry gel of the present invention also preferably contains a deoxidizer such as ascorbic acid or tetrakis(hydroxymethyl)phosphonium chloride (THPC), or a pH adjuster such as glucono-δ-lactone, perchloric acid, sulfuric acid, or salt, to accelerate the radiation-induced polymerization reaction to enhance radiosensitivity. The radiation dosimetry gel of the present invention may also contain a free radical scavenger such as hydroquinone, or an ultraviolet absorber such as guaiazulene, to suppress polymerization due to residual monomers after irradiation. The radiation dosimetry gel of the present invention may further contain a coloring agent, for example, as required.

[Method for Producing the Radiation Dosimetry Gel]

While the method for producing the radiation dosimetry gel is not particularly limited, the radiation dosimetry gel may be produced by forming a gel by mixing a mixture of two components of the components (A) to (C) or an aqueous solution or water-containing solution thereof, with the remaining one component or an aqueous solution or water-containing solution thereof. Alternatively, a gel can be formed by adding water or a water-containing solution to a mixture of these components.

The component (D) may be added by being separately mixed into the components (A) to (C) during gelation, or being mixed with the components (A) to (C) in advance. Alternatively, the component (D) may be added by immersing a gel containing the components (A) to (C), and as required, the component (D), in an aqueous solution of the component (D). A combination of operations of these treatment methods may be performed.

The concentration of the aqueous solution of the above-described component (D) is generally 0.1 to 50% by mass, preferably 1 to 30% by mass, and more preferably 5 to 20% by mass.

Furthermore, in the above-described method for producing the radiation dosimetry gel, a radiation dosimetry gel containing other components besides the components (A) to (D), such as the radiation polymerizable monomer, iron ions, or the radiosensitive pigment, can be produced by adding the other components to the components (A) to (D). The radiation dosimetry gel containing the other components can be produced by, for example, adding the other components to a mixture of two components of the components (A) to (C) or an aqueous solution or water-containing solution thereof, and/or the remaining one component or an aqueous solution or water-containing solution thereof, and mixing these components.

The components (A) to (C), as well as the component (D) and other components added as required, may be mixed by means of mechanical or manual stirring, or ultrasonication, and particularly preferably mechanical stirring. Mechanical stirring may be performed using a magnetic stirrer, a propeller-type stirrer, a planetary mixer, a disperser, a homogenizer, a shaker, a vortex mixer, a ball mill, a kneader, or an ultrasonic oscillator, for example. In particular, mixing with a planetary mixer is preferred.

The temperature during mixing may be froth the freezing point to the boiling point of the aqueous solution or aqueous dispersion, preferably −5 to 100° C., and more preferably 0 to 50° C.

Although the mixture immediately after being mixed is a sol with a low strength, it forms a gel by being allowed to stand. The mixture is preferably allowed to stand for a time of 2 to 100 hours. The mixture is allowed to stand at a temperature of −5 to 100° C., and preferably 0 to 50° C. The mixture may be poured into a mold or extrusion-molded immediately after being mixed before gelation to prepare a radiation dosimetry gel having a desired shape.

<Radiation Dosimeter>

The radiation dosimetry gel of the present invention is suitable for use as a material for measuring a radiation dose, and thus, can be charged into a container and used as a radiation dosimeter, for example, a phantom. The container is not particularly limited as long as it is non-responsive to MRI, transmits radiation, and has solvent resistance, air-tightness, and the like. Examples of preferred materials of the container include glass, acrylic resin, polyester, and ethylene-vinyl alcohol copolymer. If the container is transparent, it can be used to measure a three-dimensional dose distribution by using not only MRI, but also optical CT that enables three-dimensional measurement of opacity. After being charged with the radiation dosimetry gel, the container may be purged with nitrogen gas, for example.

EXAMPLES

The present invention will be specifically described next with reference to examples; however, the present invention is not limited to these examples.

Production Example 1: Production of an Aqueous Dispersion of a Silicate

Six parts of LAPONITE XLG (Rockwood Additives Ltd.), 1.7 parts of a 35% aqueous solution of low-polymerization-degree sodium polyacrylate (average molecular weight: 15,000; Sigma Aldrich Co. LLC.), and 92.3 parts of water were mixed, and the mixture was stirred at 25° C. until it formed a homogeneous aqueous dispersion, thus obtaining an intended product.

Production Example 2: Production of an Aqueous Solution of High-Polymerization-Degree Sodium Polyacrylate Two parts of high-polymerization-degree sodium polyacrylate (Wako Pure Chemical Industries, Ltd.; degree of polymerization: 22,000 to 70,000) and 98 parts of water were mixed, and the mixture was stirred at 25° C. until it formed a homogeneous aqueous solution, thus obtaining an intended product.

Example 1: Production of a Radiation Dosimeter Comprising a Radiation Dosimetry Gel as a Material for Measuring a Radiation Dose (VIPET (Normoxic N-Vinylpyrrolidone Based Polymer) Gel Dosimeter)

Eight grams of N,N'-methylenebisacrylamide (Wako Pure Chemical Industries, Ltd.) was added to 132 g of water, and the mixture was stirred with heating at 40 to 45° C. Twenty-two grams of the aqueous solution of high-polymerization-degree sodium polyacrylate produced in Production Example 2 was added, followed by 16 g of N-vinyl-2-pyrrolidone (Wako Pure Chemical industries, Ltd.) and 353 µL of an 80% aqueous solution of tetrakis(hydroxymethyl) phosphonium chloride (Tokyo Chemical Industry Co., Ltd.), and the mixture was stirred until it became homogeneous. Twenty-two grams of the aqueous dispersion of the silicate produced in Production Example 1 was added, and the mixture was stirred for 1 minute. The resulting mixture was charged into a 25-mL colorimetric tube and then allowed to stand for 24 hours at room temperature, thus obtaining an intended product for an irradiation test.

Example 2: Irradiation Test for the Radiation Dosimeter

Samples of the radiation dosimeter obtained in Example 1 were irradiated with x-rays (250 kV, 4 mA), using Radioflex 250CG (Rigaku Denki Co., Ltd.). Specifically, each sample was irradiated with 2, 5, 7 or 10 Gy at a dose rate of 1 Gy/minute. The samples after irradiation were analyzed by MRI measurement using 1.5 T MRI (Intera Achieva Nova Dual; Philips). The mixed turbo spin echo pulse sequence was applied to generate a pulsed magnetic field for the analysis, and $T_2$ relaxation times for the samples were obtained to calculate $R_2$ (i.e., $1/T_2$). The results shown in FIG. 1 confirmed that $R_2$ increases proportionately with the dose. The rate of increase in $R_2$ as a function of the dose was 0.078 $[Gy^{-1}s^{-1}]$.

Comparative Example 1: Production of a Radiation Dosimeter Comprising Gelatin Gel as a Material for Measuring a Radiation Dose To 81 g of water were added 4 g of N,N'-methylenebisacrylamide (Wako Pure Chemical Industries, Ltd.), 7 g of gelatin (Sigma Aldrich Co. LLC.), 8 g of N-vinyl-2-pyrrolidone (Wako Pure Chemical Industries, Ltd.), and 177 µL of an 80% aqueous solution of tetrakis(hydroxymethyl)phosphonium chloride (Tokyo Chemical Industry Co., Ltd.), and the mixture was heated at 45 to 50° C. and stirred until it became homogeneous. The resulting mixture was charged into a 25-mL colorimetric tube, and cooled with iced water for 3 hours while being allowed to stand.

Example 3: Heat-Resistance Test for the Radiation Dosimeters

Figure 2:
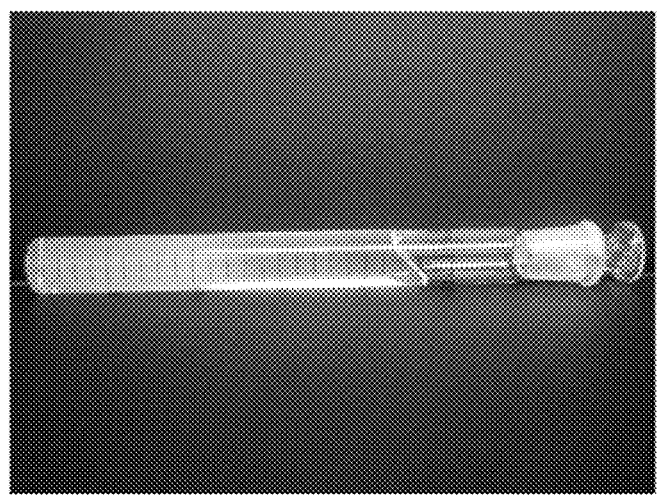
FIG. 2 is a photograph showing the result of a heat-resistance test for a radiation dosimeter (heat resistance at 20° C. of a sample of Example 1) in Example 3.
Figure 3:
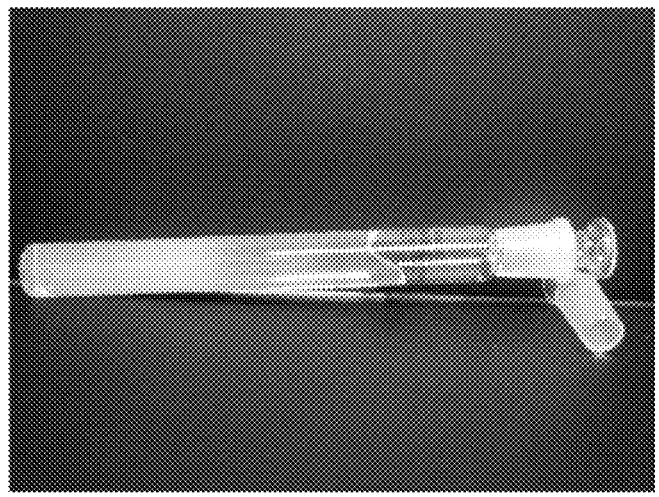
FIG. 3 is a photograph showing the result of the heat-resistance test for a radiation dosimeter (heat resistance at 30° C. of a sample of Example 1) in Example 3.
Figure 4:
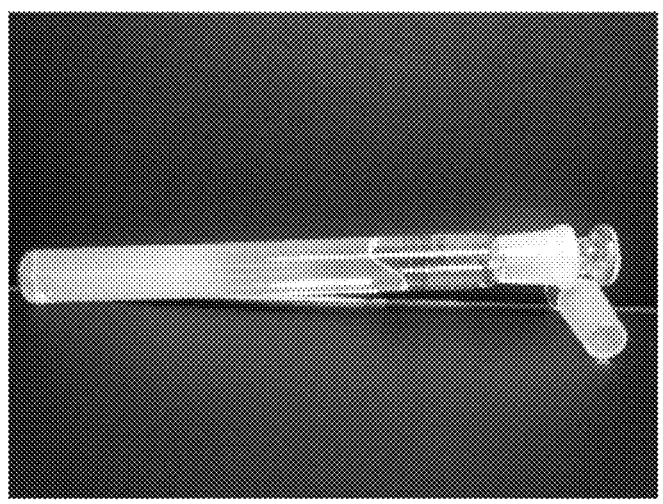
FIG. 4 is a photograph showing the result of the heat-resistance test for a radiation dosimeter (heat resistance at 60° C. of a sample of Example 1) in Example 3.
Figure 5:
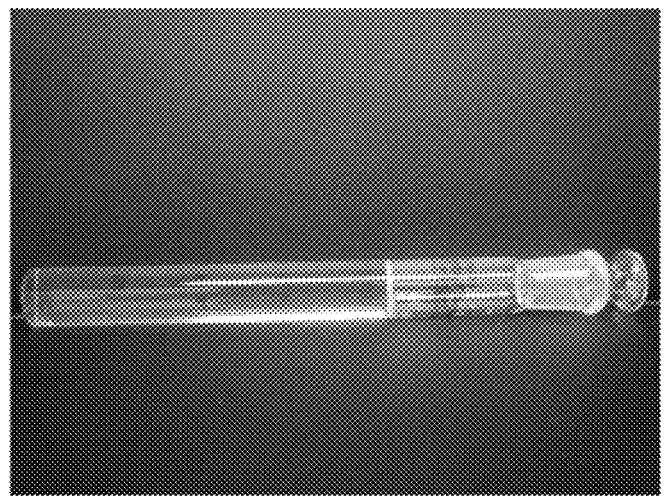
FIG. 5 is a photograph showing the result of the heat-resistance test for a radiation dosimeter (heat resistance at 20° C. of a sample of Comparative Example 1) in Example 3.
Figure 6:
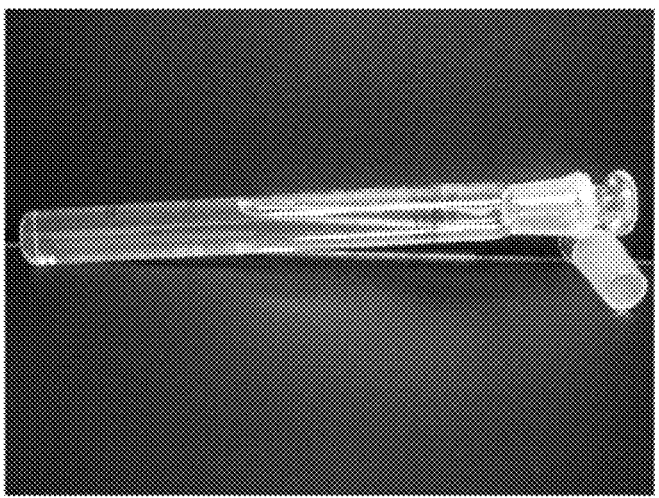
FIG. 6 is a photograph showing the result of the heat-resistance test for a radiation dosimeter (heat resistance at 30° C. of a sample of Comparative Example 1) in Example 3.
Figure 7:
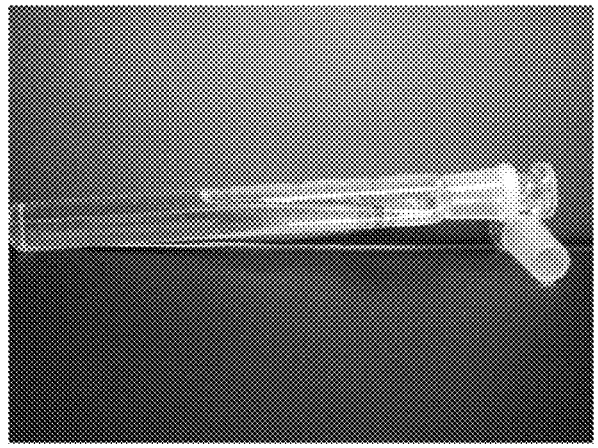
FIG. 7 is a photograph showing the result of the heat-resistance test for a radiation dosimeter (heat resistance at 60° C. of a sample of Comparative Example 1) in Example 3.

Following the procedures of Example 1 and Comparative Example 1, four test samples for each type of radiation dosimeter were prepared. Each of the samples was placed in a water bath for 30 minutes at a temperature of 20, 30, 40, or 60° C., and examined for dissolution of the gel through observation by tilting the sample. The results are shown in Table 1 as well as FIGS. 2 to 7. In Table 1, "○" indicates that the gel did not dissolve, while "x" indicates that the gel dissolved. FIGS. 2 to 4 show photographs of the samples of Example 1 after being placed in a water bath for 30 minutes at temperatures of 20, 30, and 60° C., respectively, while FIGS. 5 to 7 show photographs of the samples of Comparative Example 1 after being placed in a water bath for 30 minutes at temperatures of 20, 30, and 60° C., respectively.

TABLE 1

| Test Temperature | Test Sample | |
| --- | --- | --- |
| | Example 1 | Comparative Example 1 |
| 20° C. | ○ | ○ |
| 30° C. | ○ | X |
| 40° C. | ○ | X |
| 60° C. | ○ | X |

The results presented in Table 1 and FIGS. 2 to 7 show that the samples of Comparative Example 1 dissolved at 30° C. or higher. In contrast, the samples of Example 1 did not dissolve at all the temperatures, and maintained their gel state. This reveals that the radiation dosimetry gel of the present invention has heat resistance superior to that of gelatin widely used in conventional gel dosimeters.

Example 4: Production of a Radiation Dosimeter Comprising a Radiation Dosimetry Gel as a Material for Measuring a Radiation Dose (LCV (Leuco Crystal Violet) Gel Dosimeter)

To 68 g of water were added 37.4 mg of Leuco Crystal Violet (Tokyo Chemical Industry Co., Ltd.) and 259 mg of Triton X-100 (Sigma Aldrich Co. LLC.) and the mixture was stirred at room temperature for 10 minutes, and then trichloroacetic acid (Tokyo Chemical Industry Co., Ltd.) was slowly added until the pH of the mixed solution reached 4 and the mixture was stirred at room temperature for 10 minutes. Sixteen grams of the aqueous solution of high-polymerization-degree sodium polyacrylate produced in Production Example 2 was added and the mixture was stirred until it became homogeneous, and then 16 g of the aqueous dispersion of the silicate produced in Production Example 1 was added and the mixture was stirred far 10 minutes. The resulting mixture was charged into a 25-mL colorimetric tube and then allowed to stand for 24 hours in a cool, dark place, thus obtaining an intended product for an irradiation test.

Example 5: Production of a Radiation Dosimeter Comprising a Radiation Dosimetry Gel as a Material for Measuring a Radiation Dose (Fricke Gel Dosimeter)

To 84 g of water was added 200 mg of citric acid monohydrate (Junsei Chemical Co., Ltd.) and the mixture was stirred at room temperature for 5 minutes, and then 4.0 mg of ammonium iron (II) sulfate hexahydrate (Kanto Chemical Co., Inc.) was added and the mixture was stirred at room temperature for 5 minutes. 8.0 g of the aqueous solution of high-polymerization-degree sodium polyacrylate produced in Production Example 2 was added and the mixture was stirred until it became homogeneous, and then 8.0 g of the aqueous dispersion of the silicate produced in Production Example 1 was added and the mixture was stirred for 10 minutes. Additionally, 2.0 mg of xylenol orange was added to the reaction mixture, and the mixture was stirred for 10 minutes. The resulting mixture was charged into a PET container and then allowed to stand for 22 hours in a cool, dark place, thus obtaining an intended product for an irradiation test.

Example 6: Irradiation Test for the Radiation Dosimeter Produced in Example 4 (LCV Gel Dosimeter)

Figure 8:
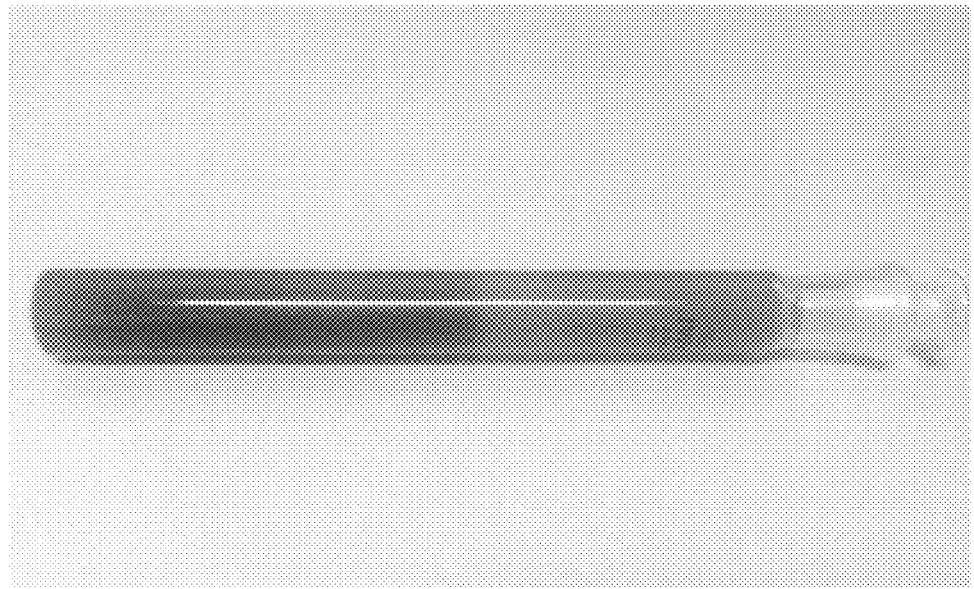
FIG. 8 is a photograph showing the result of an irradiation test for a radiation dosimeter in Example 6.

The sample was irradiated with 20 Gy and 30 Gy of x-rays (250 kV, 4 mA) at 1 Gy/minute, using Radioflex 250CG (Rigaku Denki Co., Ltd.), and examined for coloration. The results are shown in FIG. 8. The left side of the sample shown in FIG. 8 was irradiated with 20 Gy and 30 Gy, and the right half of the sample shown in FIG. 8 was an unirradiated region. The results confirmed that the sample is colored blue upon irradiation. Furthermore, gradations of blue were visually observed in the region irradiated with 20 Gy and 30 Gy, which confirmed that the coloration was in line with an increase in the dose.

Example 7: Irradiation Test for the Radiation Dosimeter Produced in Example 5 (Fricke Gel Dosimeter)

The sample was irradiated with 40 Gy of x-rays (250 kV 4 mA) at 1 Gy/1 minute, using Radioflex 250CG (Rigaku Denki Co., Ltd.), with the right half of the sample being blocked from the radiation with a shield. A change in the coloration was observed from a contrast between the right and left portions of the sample.

INDUSTRIAL APPLICABILITY

The radiation dosimetry gel of the present invention can be produced simply by mixing raw materials that are industrially readily available, at room temperature without requiring heating, and is excellent in heat resistance and self-supporting property. This makes the radiation dosimetry gel of the present invention applicable to various gel dosimeters.

The invention claimed is:

1. A radiation dosimetry gel characterized by comprising a water-soluble organic polymer (A) having an organic acid salt structure or an organic acid anion structure, a silicate (B), and a dispersant (C) for the silicate.

2. The radiation dosimetry gel according to claim 1, wherein the water-soluble organic polymer (A) is a fully neutralized or partially neutralized polyacrylate having a weight average molecular weight of 1,000,000 to 10,000,000.

3. The radiation dosimetry gel according to claim 1, wherein the silicate (B) is one or more water-swellable silicate particles selected from the group consisting of smectites, bentonite, vermiculite, and mica.

4. The radiation dosimetry gel according to claim 1, wherein the dispersant (C) is one or more selected from the group consisting of sodium orthophosphate, sodium pyrophosphate, sodium tripolyphosphate, sodium tetraphosphate, sodium hexametaphosphate, sodium polyphosphate, sodium poly(meth)acrylate, ammonium poly(meth)acrylate, sodium acrylate/sodium maleate copolymer, ammonium acrylate/ammonium maleate copolymer, sodium hydroxide, hydroxylamine, sodium carbonate, sodium silicate, polyethylene glycol, polypropylene glycol, sodium humate, and sodium ligninsulfonate.

5. The radiation dosimetry gel according to claim 1, further comprising a compound (D) having a divalent or higher positive charge.

6. The radiation dosimetry gel according to claim 5, wherein the compound (D) is one or more compounds selected from the group consisting of compounds containing group II elements, compounds containing transition elements, compounds containing amphoteric elements, and compounds containing polyamines.

7. The radiation dosimetry gel according to claim 1, comprising a radiation polymerizable monomer.

8. The radiation dosimetry gel according to claim 1, comprising iron(II) ions or iron(III) ions, or both.

9. The radiation dosimetry gel according to claim 1, comprising a radiosensitive pigment.

10. The radiation dosimetry gel according to claim 1, comprising a deoxidizer.

11. The radiation dosimetry gel according to claim 1, comprising a pH adjuster.

12. A radiation dosimeter comprising the radiation dosimetry gel according to claim 1 as a material for measuring a radiation dose.

* * * * *